(12) United States Patent
Miller

(10) Patent No.: US 12,352,126 B2
(45) Date of Patent: Jul. 8, 2025

(54) SEAL ARRANGEMENT AND SYSTEM

(71) Applicant: Baker Hughes Oilfield Operations LLC, Houston, TX (US)

(72) Inventor: Wade Miller, Broken Arrow, OK (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 18/598,411

(22) Filed: Mar. 7, 2024

(65) Prior Publication Data
US 2024/0309723 A1    Sep. 19, 2024

Related U.S. Application Data

(60) Provisional application No. 63/498,727, filed on Apr. 27, 2023, provisional application No. 63/462,050, filed on Apr. 26, 2023, provisional application No. 63/452,791, filed on Mar. 17, 2023.

(51) Int. Cl.
  *E21B 33/10* (2006.01)
  *F16J 15/06* (2006.01)

(52) U.S. Cl.
  CPC ............. *E21B 33/10* (2013.01); *F16J 15/064* (2013.01)

(58) Field of Classification Search
  CPC .................................. E21B 33/10; F16J 15/064
  See application file for complete search history.

(56) References Cited

U.S. PATENT DOCUMENTS

| 4,283,062 A | * | 8/1981 | Catanzaro | ............... B29C 45/17 92/168 |
| 5,056,757 A | * | 10/1991 | Wood | ....................... F16J 15/20 277/516 |
| 5,833,018 A | | 11/1998 | von Gynz-Rekowski | |

(Continued)

FOREIGN PATENT DOCUMENTS

WO    2020068642 A1    4/2020

OTHER PUBLICATIONS

Flanged Spring Energized PTFE Rotary Seal; Gallagher Fluid Seals, Inc. 7 pages. Retrieved from the internet on Mar. 23, 2023: https://www.gallagherseals.com/flanged-spring-energized-ptfe-rotary-seal.html.

(Continued)

*Primary Examiner* — Matthew R Buck
(74) *Attorney, Agent, or Firm* — Baker Hughes Patent Organization

(57) ABSTRACT

A seal arrangement includes a seal assembly and a seal subassembly in operable contact with the seal assembly. The seal subassembly is configured to impart energy to the seal assembly to promote sealing of the seal assembly with a mating surface. A non-sealing feature of the seal subassembly depends from the seal subassembly and is interactive with a load shoulder of a structure adjacent the seal subassembly. The seal arrangement redirects a mechanical load path through the seal subassembly to the non-sealing feature, during use. A method of protecting a seal subassembly from reverse loading is by redirecting a load path through a seal subassembly to a non-sealing feature, while also permitting pressure energizing of the seal assembly by the seal subassembly in a sealing direction. A downhole system includes a borehole in a formation, a string in the borehole, and a seal.

20 Claims, 13 Drawing Sheets

(56) References Cited

U.S. PATENT DOCUMENTS

| | | |
|---|---|---|
| 6,173,785 B1 | 1/2001 | Adams et al. |
| 6,203,020 B1 | 3/2001 | Mireles, Jr. et al. |
| 9,341,039 B2 * | 5/2016 | Galle .................. E21B 33/03 |
| 2003/0205389 A1 | 11/2003 | Deaton et al. |
| 2007/0235191 A1 | 10/2007 | Loughlin |
| 2014/0084199 A1 | 3/2014 | Newlands et al. |
| 2015/0102247 A1 | 4/2015 | Leboeuf et al. |
| 2017/0370175 A1 | 12/2017 | Hiorth |
| 2021/0340837 A1 | 11/2021 | Fox et al. |
| 2024/0309724 A1 | 9/2024 | Miller et al. |

OTHER PUBLICATIONS

Flanged V-Spring-loaded-high-pressure rotary seal for spinning bore VS-PS19A; American High Performance Seals; 6 pages; retrieved from the internet Mar. 23, 2023: https://ahpseals.com/product/vs-ps19a-3/.

Notification of Transmittal of the International Search Report and the Written Opinion of the International Searching Authority, or the Declaration; PCT/US2024/020048; Mail date: Jul. 9, 2024: 10 pages.

Notification of Transmittal of the International Search Report and the Written Opinion of the International Searching Authority, or the Declaration; PCT/US2024/020138; Mail date: Jun. 28, 2024; 11 pages.

* cited by examiner

SEAL ARRANGEMENT AND SYSTEM

CROSS REFERENCE TO RELATED APPLICATIONS

This application claims the benefit of an earlier filing date from U.S. Provisional Application Ser. No. 63/452,791, filed Mar. 17, 2023, U.S. Provisional Application Ser. No. 63/498,727 filed Apr. 27, 2023, and U.S. Provisional Application Ser. No. 63/462,050 filed Apr. 26, 2023, the entire disclosure of which is incorporated herein by reference.

BACKGROUND

In the resource recovery and fluid sequestration industries, sealing is a significant issue. Seal assemblies are created to allow for pressure actuation of myriad devices and pressure containment in myriad others. Many work quite well but there is always room for improvement. In some seal assemblies, unidirectional seals are used to energize other seals. This works well also but sometimes with pressure reversals, such unidirectional seals may be deleteriously affected. Since pressure reversals are common in the industries mentioned, the art is always receptive to alternative configurations that reduce drawbacks.

SUMMARY

An embodiment of a seal arrangement including a seal assembly, a seal subassembly in operable contact with the seal assembly, the seal subassembly configured to impart energy to the seal assembly to promote sealing of the seal assembly with a mating surface, a non-sealing feature of the seal subassembly depending from the seal subassembly and interactive with a load shoulder of a structure adjacent the seal subassembly, the seal arrangement redirecting a mechanical load path through the seal subassembly to the non-sealing feature, during use.

An embodiment of a downhole tool including a movable structure having a function related to the downhole tool, an actuator for the movable structure, and a seal arrangement operably connected to the actuator.

An embodiment of a method of protecting a seal subassembly, from reverse loading by redirecting the load path through the seal subassembly to the non-sealing feature, while also permitting pressure energizing of the seal assembly by the seal subassembly in a sealing direction.

An embodiment of a downhole system including a borehole in a subsurface formation, a string in the borehole, and the arrangement disposed within or as a part of the string.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
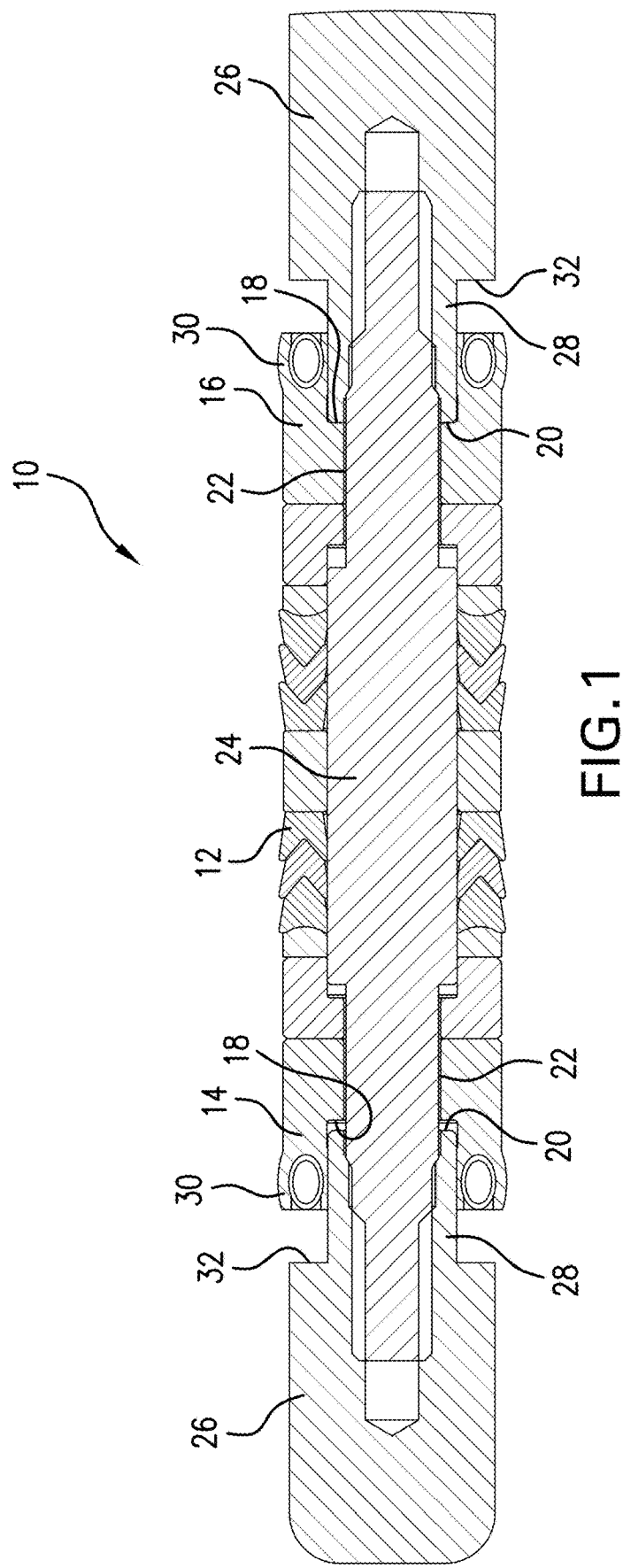
FIGS. 1 and 2 illustrate a first embodiment of a seal arrangement as disclosed herein in a shifted right position and a shifted left position, respectively.
Figure 2:
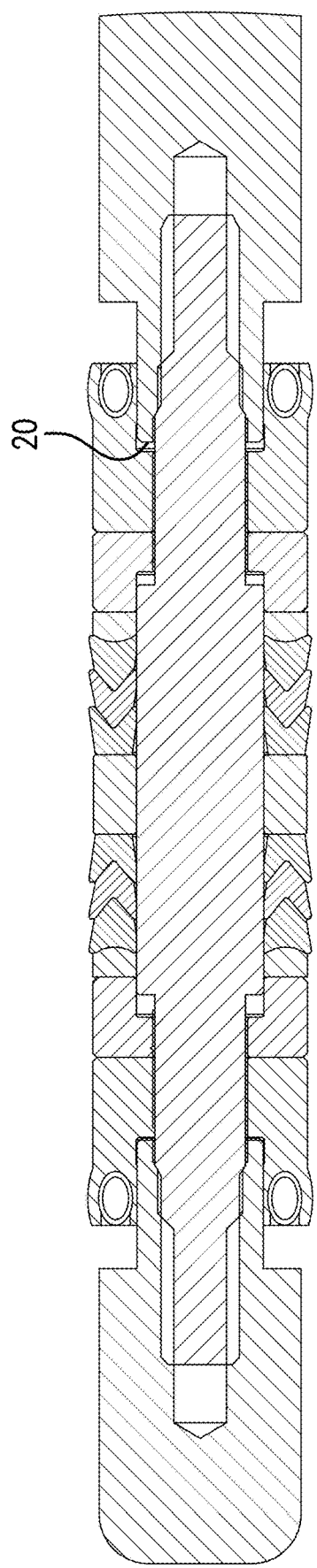

Referring to FIGS. 1 and 2, a first embodiment of a seal arrangement 10 is illustrated. The drawings illustrate the arrangement 10 in a shifted right position and a shifted left position, respectively. In this embodiment, a seal assembly 12 (which may have one or more seal components) is illustrated centrally between two seal subassemblies 14 and 16. The seal subassemblies 14 and 16 are unidirectional in their sealing meaning that they hold pressure in one direction, i.e. toward the seal assembly 12, and allow pressure to escape (or vent) in an opposite direction, i.e. away from the seal assembly. In one embodiment, the seal subassemblies 14 and 16 include a mechanically energized construction wherein an internal energizer energizes a unidirectional seal member 30 of each seal subassembly. As a result of the seal subassemblies 14 and 16 being in operable contact with the seal assembly 12 and each subassembly holding pressure in a sealing direction (i.e. towards the seal assembly), the seal assembly is thus energized by the seal subassemblies in their respective sealing directions. The energizing of seal assembly 12, as composed of a plurality of chevron type elements (for example), serves to enhance the sealing performance of the seal assembly, especially in environments with minimal differential pressure (e.g. less than 500 psi differential pressure acting across the seal arrangement). In such environments, one of ordinary skill will appreciate that a seal arrangement devoid of some form of mechanically energizing feature will be more susceptible to leakage as such arrangements (often a plurality of chevrons) can struggle to achieve sufficient contact pressure with the surrounding surfaces when only minimally pressure energized. By incorporating at least one mechanically energized unidirectional seal into the seal arrangement, the contact pressures required to seal against minimal differential pressure are further developed by the forces applied by the energizer within the unidirectional seal. As illustrated in FIGS. 1, 2, 8 and 9, seal subassemblies 14 and 16 may be mechanically energized with an internal energizing element such as a coil-type spring. In other embodiments, the internal energizing element may be a cantilever spring (as in FIGS. 3 through 7). Contemplated materials for said springs include metals such as stainless steels or high-strength corrosion resistant alloys and reinforced thermoplastics such as polyether ether ketone with carbon fiber filler. In alternate embodiments, seal subassemblies 14 and 16 are mechanically energized with an internal elastomeric element (such as an O-Ring) or more simply by their structural shape and elasticity when compressed into a seal bore. It is to be appreciated that each of the seal subassemblies 14 and 16 include a non-sealing feature 18 extending from the seal subassembly 14, 16. In the embodiment illustrated, the feature 18 is composed of the same material as the rest of the seal subassemblies 14, 16 but is treated during manufacture such that the feature 18 is much more resistant to deformation than the rest of the seal subassembly 14, 16. As such, feature 18 provides protection to the subassembly 14, 16 in the case of reverse loading by facilitating a redirection of a mechanical load path through the seal subassembly to the feature 18 and into a load shoulder 20. This prevents the reverse load being borne by the more deformable portions of the seal subassembly 14, 16 (comprising the unidirectional seal member 30) and thereby protects the seal subassembly 14, 16 from damage during a reverse pressure event.

The load shoulder 20 is a part of a gland 22 that may be, for example, machined into a mandrel 24 upon which the arrangement 10 is positioned; may be created by threading a component 26 on to the mandrel 24 (on one or both sides) as illustrated in FIGS. 1 and 2 where an end of a box thread housing 28 serves as the load shoulder 20; or machined into a housing where the mandrel 24 is replaced with a rod piston (not shown in FIG. 1 but addressed in other embodiments hereinafter).

Because of the mechanical load path redirect through feature 18 a unidirectional seal member 30 will never be pushed into contact with surface 32, which as noted protects integrity of the member 30.

It will be appreciated that in the embodiment of FIGS. 1 and 2, load shoulder 20 is presented on both longitudinal ends of the arrangement 10 and accordingly seal subassembly 14 is protected from reverse pressure toward the left of the figure in FIG. 2 and seal subassembly 16 is protected from reverse pressure toward the right of the figure in FIG. 1.

Figure 3:
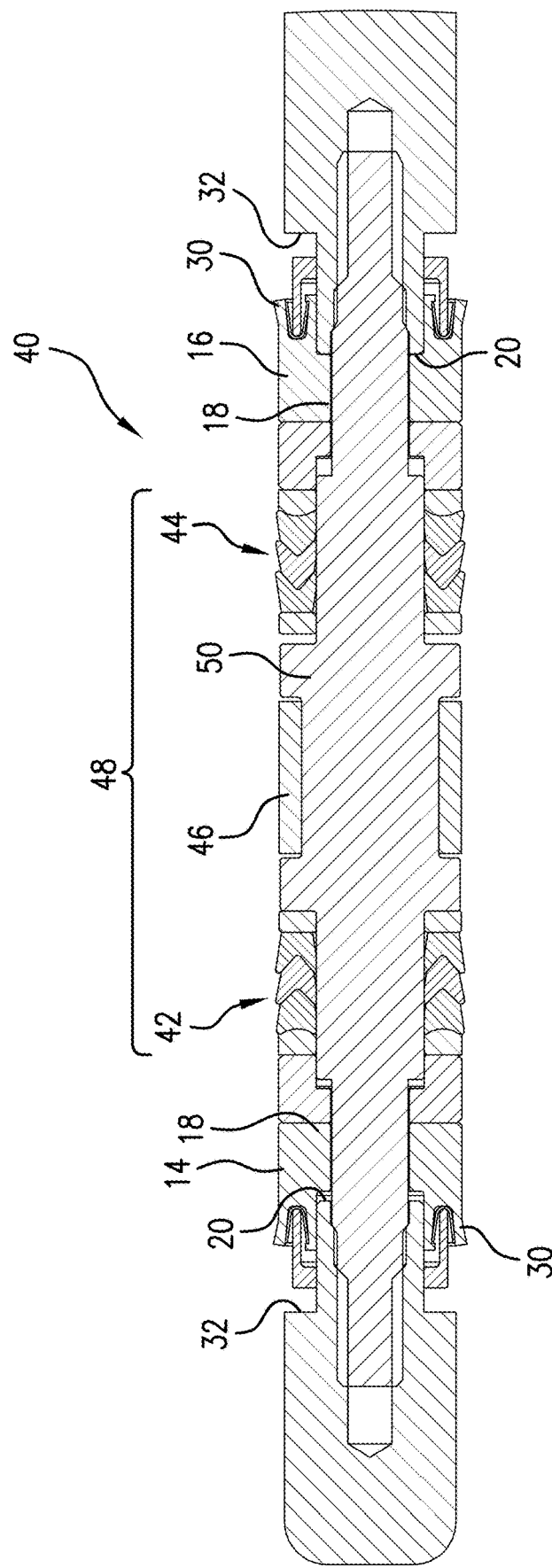
FIGS. 3 and 4 illustrate a second embodiment of a seal arrangement as disclosed herein in a shifted right position and a shifted left position, respectively.
Figure 4:
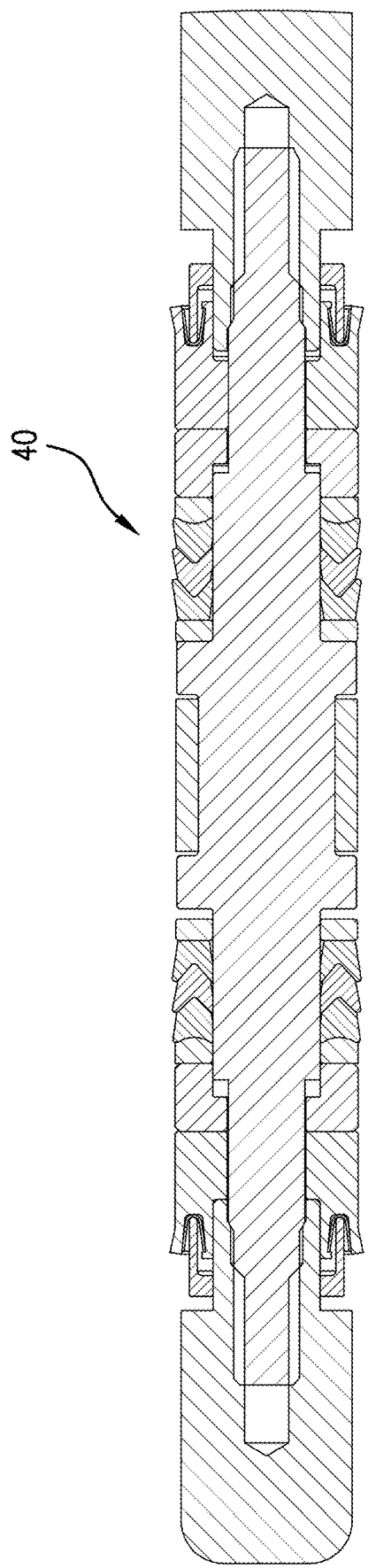

Referring to FIGS. 3 and 4, a second embodiment of a seal arrangement denoted 40 is illustrated. FIG. 3 illustrates the arrangement 40 shifted to the right of the figure and FIG. 2 illustrates the arrangement shifted to the left of the figure. In this embodiment, what was the seal assembly 12 in FIG. 1 has been broken into two sections 42 and 44 separated by a centralizer bearing 46. The sections 42, 44 and the bearing 46 are collectively considered the seal assembly 48 for brevity. The most significant difference between FIGS. 1 and 3 is that the seal subassemblies 14, 16 need move longitudinally a shorter distance to energize the seal assembly 48 because each subassembly 14, 16 need only move one section 42, 44 respectively against the bearing 46 or a housing 50 of the bearing. In other respects, the function is the same as FIG. 1. The feature 18 is a part of a mechanical load path redirect into the load shoulder 20, thereby protecting the seal member 30 from contact with the surface 32.

Figure 5:
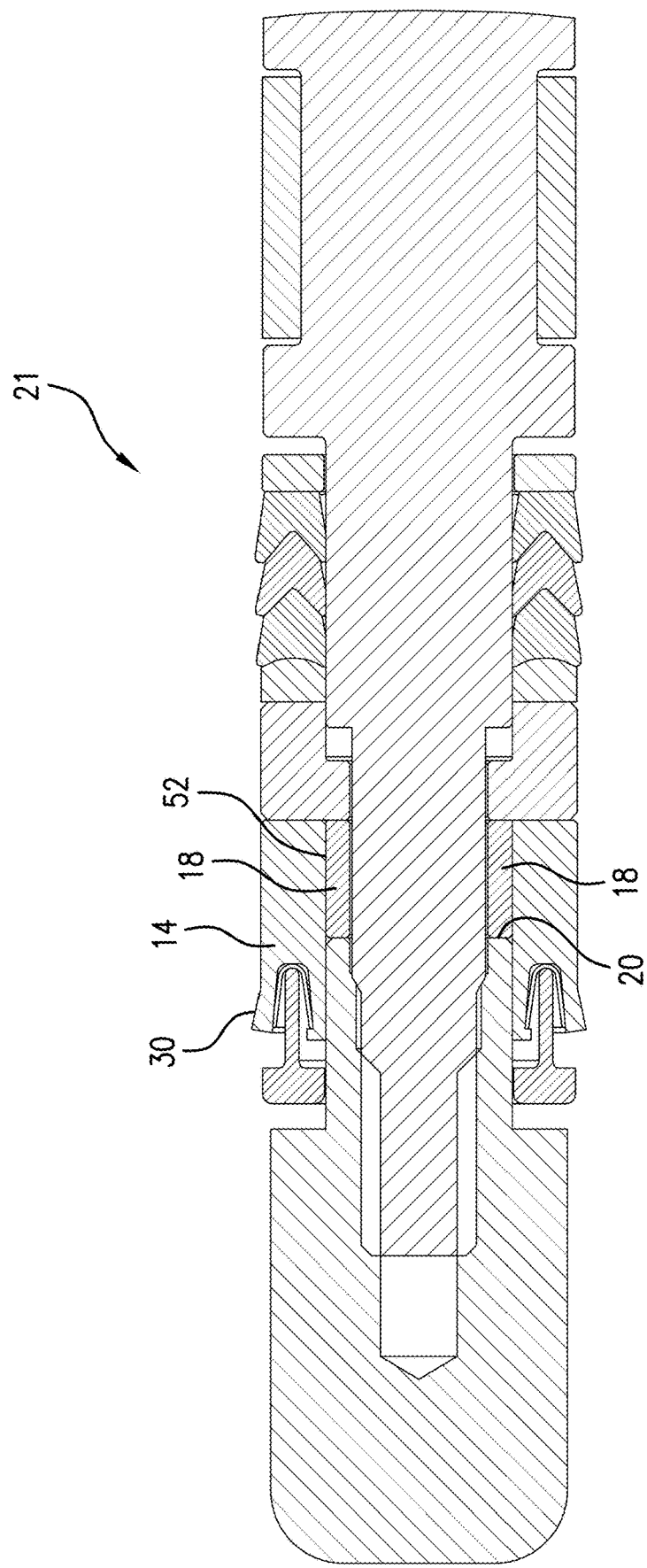
FIG. 5 is a third embodiment of a seal arrangement as disclosed herein in a shifted left position.

FIG. 5 is an illustration of a third embodiment of a seal arrangement denoted 21 that uses the configuration of FIG. 3 but is also applicable to FIG. 1 and all other embodiments. The difference is that the feature 18 is illustrated as a different material from that of the seal member 30. Feature 18 is still made one with the member 30 and is still a seal subassembly 14 but the material itself is different. The subassembly 14 may be created using an additive manufacturing process to print a different material having a greater resistance to deformation than the member 30 or the feature 18 could begin as a separate component that is then bonded chemically, mechanically or both to the member 30. The feature might then be a metal ring for example that is connected at attachment interface 52 to member 30 (e.g. bonded, glued, welded, fused, insert molded, overmolded, fastened by a fastener such as pin or threaded member, etc.,) or geometrically locked to the member 30 (e.g. dovetail feature or similar), providing the feature 18 does not move relative to member 30 and thereby participates in the mechanical load path redirection to the load shoulder 20.

Figure 6:
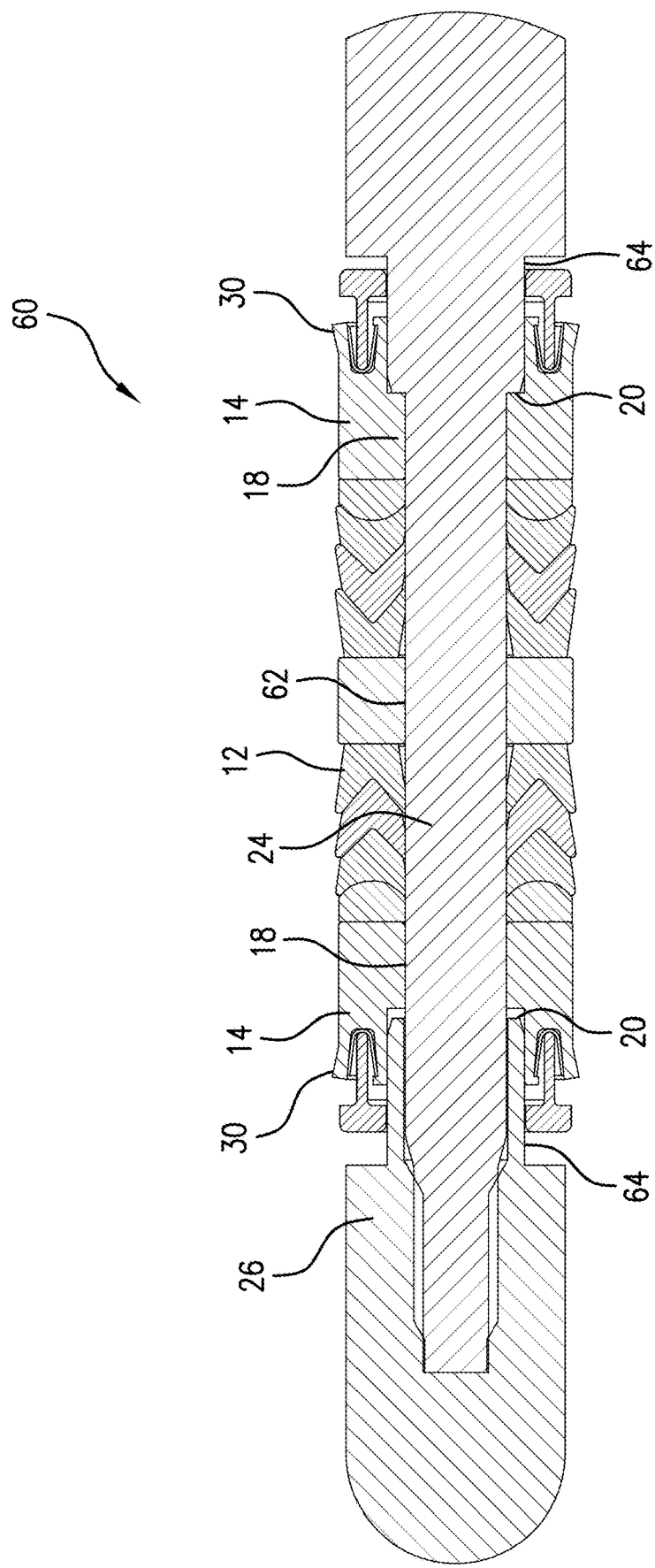
FIG. 6 is a fourth embodiment of a seal arrangement as disclosed herein in a shifted right position.
Figure 7:
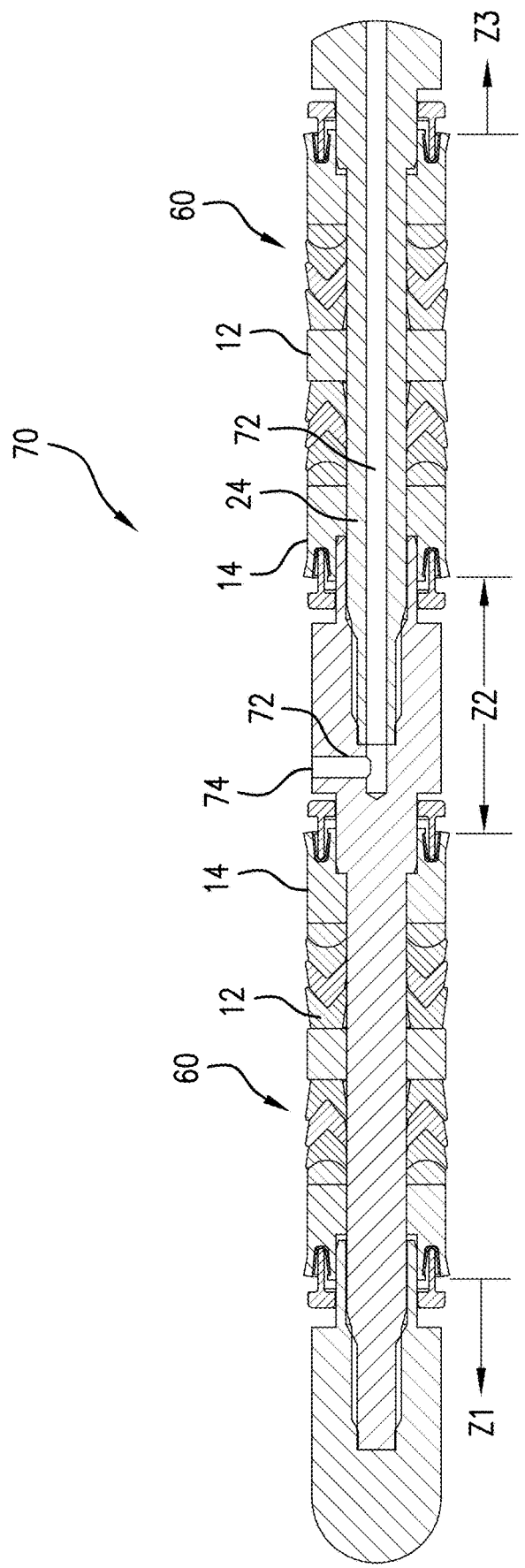
FIG. 7 is a fifth embodiment of a seal arrangement as disclosed herein having a central pressure conduit.
Figure 7A:
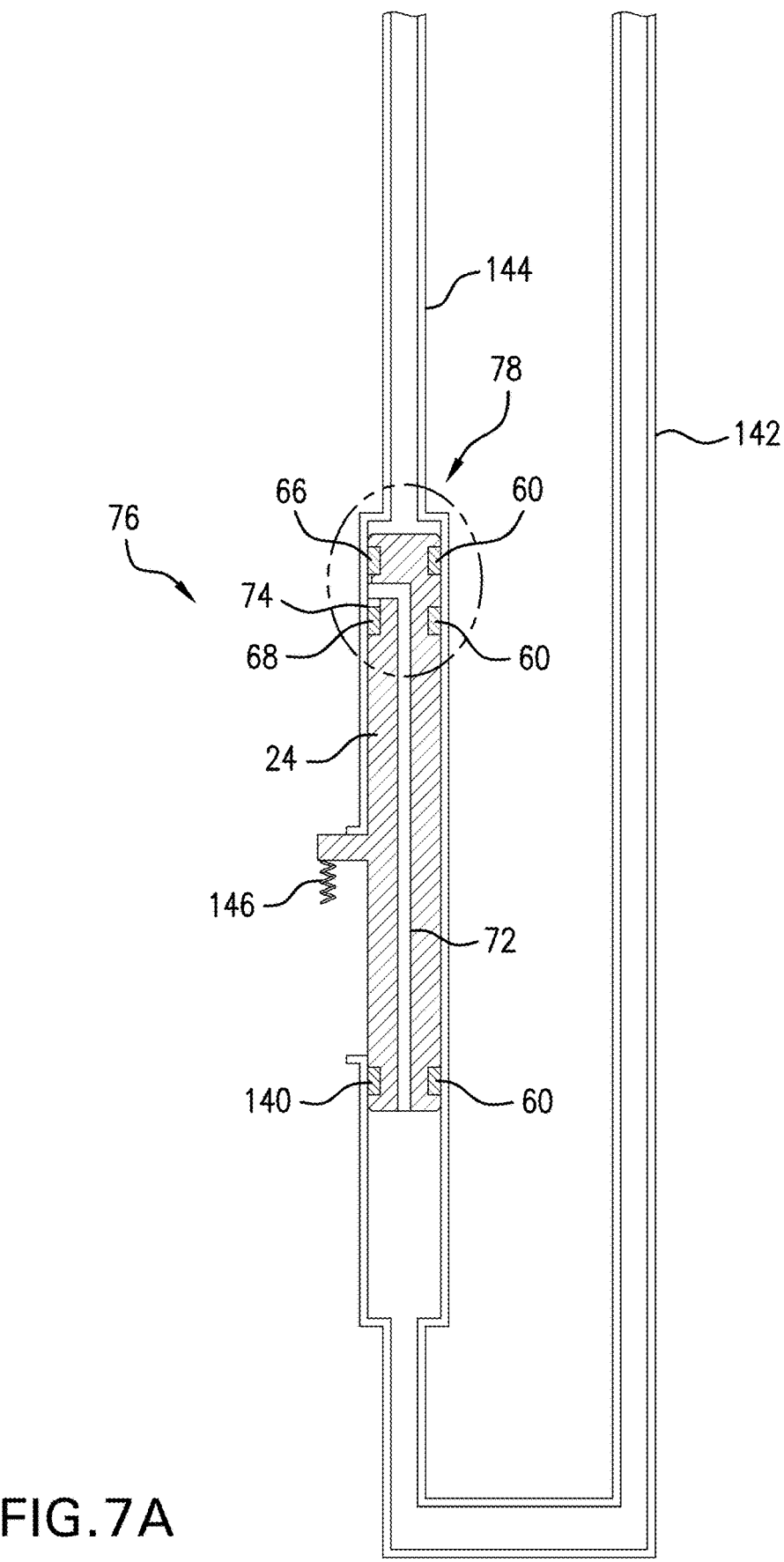
FIG. 7A is an environment figure to enhance understanding of FIG. 7 and to elucidate the seal arrangement and its location.

Referring to FIG. 6, a fourth embodiment of a seal arrangement denoted arrangement 60 is very similar to the FIG. 1 embodiment except that there is only one component 26 rather than two as in FIG. 1. This eliminates one threaded connection making the arrangement more rigid in bending and stronger in tension. The elimination of one threaded connection also reduces the potential for concentricity mismatch between the different components and sealing surfaces upon which the seal arrangement 60 installs. Such mismatch in concentricity can develop during in the makeup of threaded connections as the centerlines of the mating components may not perfectly align. It should also be noted that the mandrel 24 is modified from FIG. 1 as a load shoulder 20 is now incorporated into the mandrel. Incorporation of a load shoulder 20 into the mandrel 24 eliminates a potential leak path into a passage 72, as depicted in FIGS. 7 and 7A and discussed in subsequent paragraphs, which could otherwise occur through the previously threaded connection as in the embodiments illustrated in FIGS. 1 through 4. The elimination of one threaded connection also allows each component of the arrangement to be slid onto the mandrel 24 from one end and onto a common diameter. Hence, seal installation onto one diameter is better suited to the assembly process. As a result of each load shoulder 20 being larger in diameter than the center sealing surface 62 on the mandrel 24, the seal assembly 12 will thus have a greater cross sectional dimension in this embodiment than that of FIG. 1. Likewise, the seal assembly 12 will have a greater cross sectional dimension than the unidirectional seal member 30 of each seal subassembly 14, which comprises the more deformable portions of the seal subassembly that form the pressure boundary between the larger diameter sealing surface 64 and the bore (not shown). Configuring the seal assembly 12 with a larger cross section in comparison to the unidirectional seal member 30 of the seal subassemblies 14 results in increased wear tolerance (i.e. ability of the seal assembly to sustain larger amounts of wear without deleterious effect) thereby extending the operable life of the seal arrangement 60 in dynamic applications. A larger cross sectional size of the seal assembly 12 would also allow for an increased radial squeeze to be applied to the constituent elements of the seal assembly (typically improving sealing performance due to the resultant contact pressures between the seal elements and the surrounding structures being increased) with comparatively less operating friction due to the greater squishiness or elasticity of the sealing materials in larger cross sectional sizes. A larger sized seal assembly 12 would also possess greater structural load carrying capacity. In other respects, the embodiment illustrated by FIG. 6 is the same as the FIG. 1 embodiment.

Referring to FIG. 7, a fifth embodiment of a seal arrangement denoted 70, is illustrated. In this embodiment, seal arrangement 70 is installed upon a mandrel that makes up a portion of a pressure balanced rod piston control system of a subsurface safety valve as taught in U.S. Pat. No. 6,173,785 B1 and embodied in the Reach™ tubing retrievable safety valve commercially available from Baker Hughes, Houston Texas. The portion of a pressure balanced rod piston control system as shown in FIG. 7 is focused on the circumscribed area depicted in FIG. 7A. This embodiment is useful for pressure balanced and wellbore pressure insensitive applications. The embodiment includes a pair of the same arrangement as in FIG. 6 but a pressure conduit 72 is disposed in each of the mandrel sections 24. Pressure conduit 72 is routed through the entirety of one mandrel 24 and through only a portion of the second mandrel 24 to an exit point 74 located between the two seal arrangements 60. Pressure is hence ported from elsewhere in the system to a location between the two seal arrangements 60. In one embodiment, such pressure could be useful in the energizing of seal assemblies 12 by way of pressure energizing the seal subassemblies 14 located nearest the pressure conduit 72. In another embodiment, the porting of pressure through a pressure conduit 72 to a location between the two seal arrangements 60 is useful for the purpose of fail-safe functionality of a tubing retrievable safety valve. In such embodiment, a leak in wellbore pressure across the seal arrangement 60 on the right side in FIG. 7 would result in the tubing retrievable safety valve's fail-safe closure. Each of the arrangements 60 operates as was described above and the arrangement 70 is wellbore pressure insensitive as discussed further below.

FIG. 7a is an environment figure to enhance understanding of FIG. 7 and to elucidate the seal arrangement 70 which is located at region 78. System 76 is a pressure balanced rod piston control system of a subsurface safety valve. Mandrel 24 is configured as a rod piston assembly with three seal arrangements 60 disposed thereupon and located at a top, middle, and bottom position (66, 68, and 140 respectively). The seal arrangements located at the middle and bottom positions 68, 140 are diametrically the same in size and seal against the same wellbore pressure in opposite directions. As a result, the pressure induced forces acting upon mandrel 24 from the presence of wellbore pressure serve to cancel one another out, resulting in a force balance and wellbore pressure insensitivity (while simultaneously placing the mandrel 24 in a state of tension). Pressure conduit 72 makes up a portion of a balance line 142 that is used to hydrostatically balance pressure across the top and bottom of mandrel 24 when the system 76 is in the closed position and the hydraulic pressure normally applied to open the subsurface safety valve is removed. The hydrostatic pressure acting upon the balance line 142 also serves to reduce the closing force requirement of power spring 146 and hence hydraulic supply pressures necessary to open the valve with control line 144.

Figure 8:
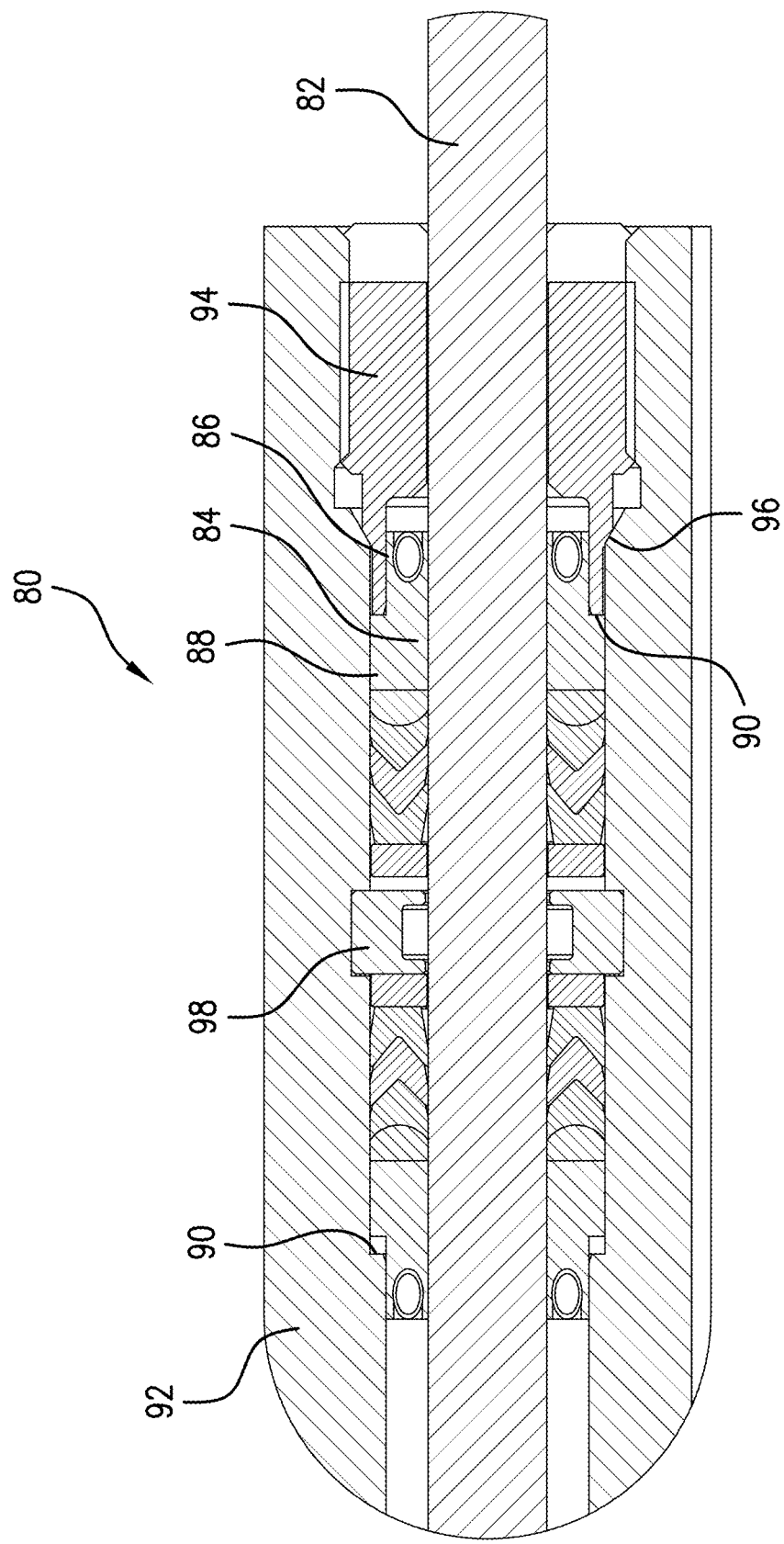
FIGS. 8 and 9 illustrate a sixth embodiment of a seal arrangement as disclosed herein in a shifted right position and a shifted left position, respectively.
Figure 9:
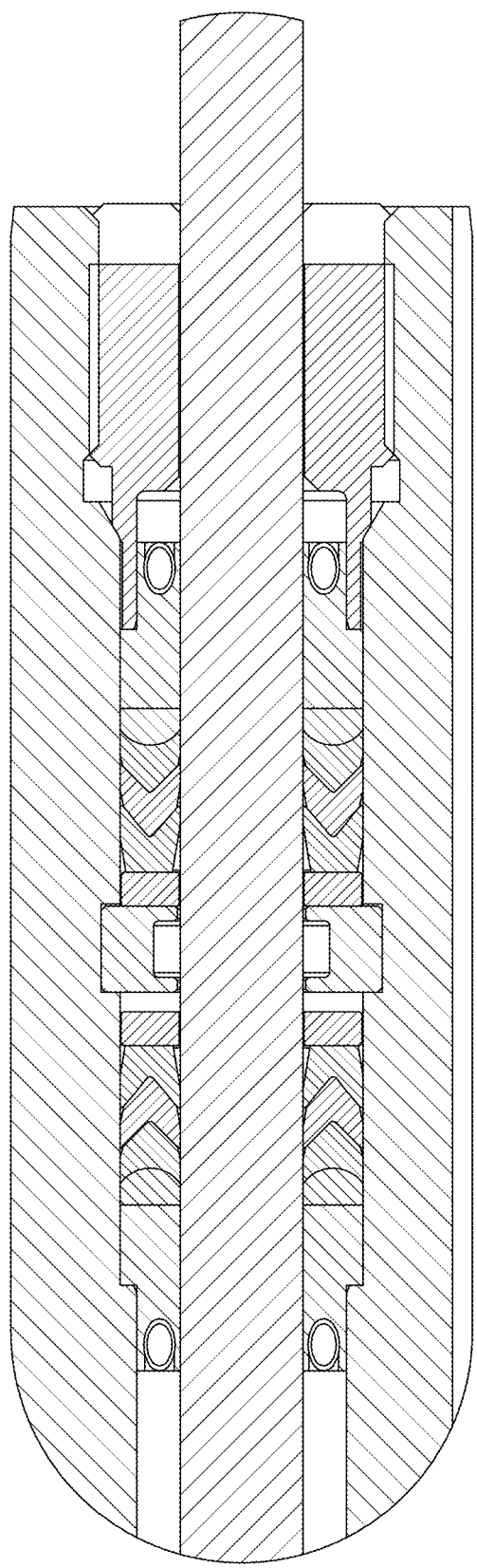

FIGS. 8 and 9 illustrate a sixth embodiment wherein the illustrated seal arrangement 80 is configured as a rod seal installed upon a rod piston type actuator. Arrangement 80 includes a rod piston 82 about which is positioned seal subassemblies 84 having seal members 86 similar to members 30 and non-sealing features 88 similar to features 18 but inverted. Load shoulders 90, similar to load shoulders 20 but radially outwardly of the seal subassemblies 84, are a part of a housing 92 or a threaded component 94. The component 94 in some embodiments may also include a seal face 96 that may comprise a metal to metal seal. Arrangement 80 works in the same way in that the mechanical load path in a reversal of pressure (i.e. with pressure acting in the non-sealing direction of a unidirectional seal) will be redirected through the seal subassemblies 84 to the non-sealing features 88 when one of the features 88 contacts the corresponding load shoulder 90. Optionally, arrangement 80 may also include a centralizer 98 that engages the housing 92 to limit radial movement of the rod piston 82. Centralizer 98 also serves as a load member to transmit pressure induced load from arrangement 80 into the housing 92. The transmission of load into housing 92 by way of the centralizer 98 helps to reduces the number of occasions in which the seal subassemblies 84 are exposed to reverse pressure loading (i.e. loading in the non-sealing direction). In dynamic applications, such as wherein seals are installed upon a translating or rotating piston, the development of trapped pressure between the elements of a multi-element seal can occur because of imperfect sealing during dynamic motion. For seal arrangements such as 80 that include a centralizer 98, trapped pressure is a common cause of reverse pressure loading. Centralizer 98 may be composed of a number of segments rather than a full ring to ease installation. Alternatively, centralizer 98 may be a snap ring construction that is biased radially outwardly. It is to be appreciated that the embodiment of arrangement 80 may also be configured with a pressure conduit, like that of conduit 72 in FIG. 7, in the rod piston 82 for the same purpose.

Figure 10:
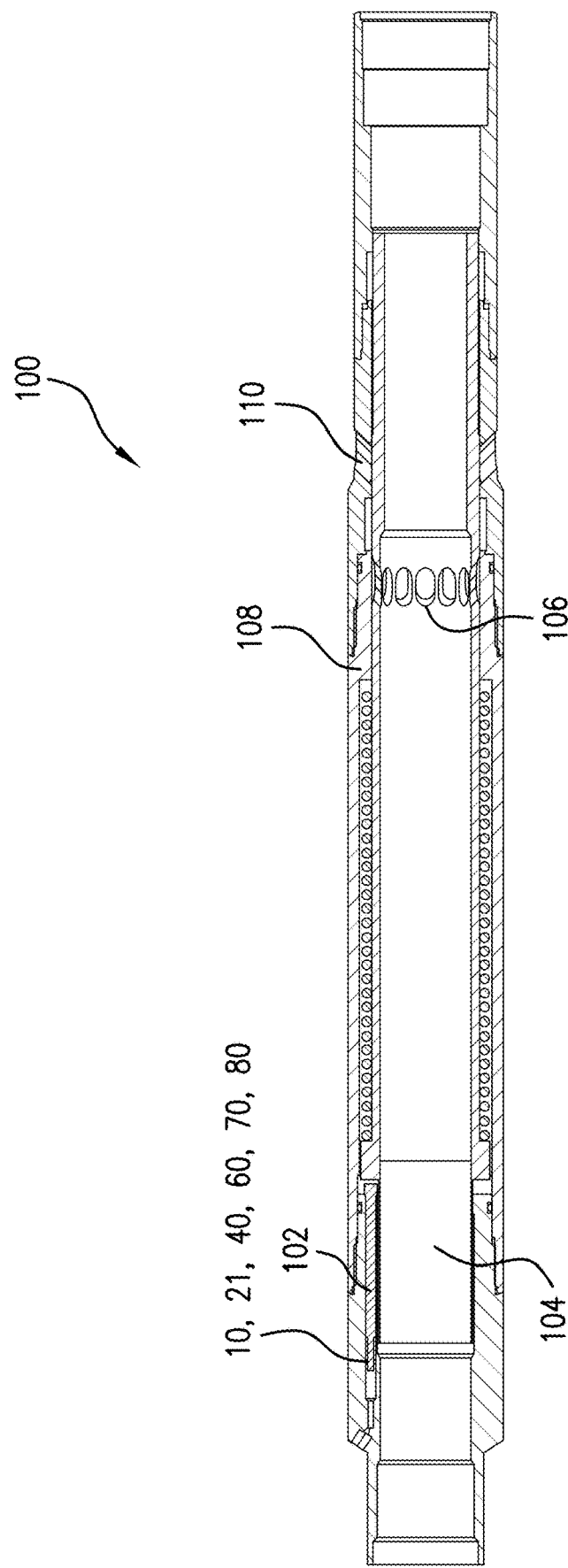
FIG. 10 is a downhole tool including one of the seal arrangement embodiments disclosed herein.

Referring to FIG. 10, a downhole tool 100 is illustrated that uses the seal arrangement 10, 21, 40, 60, 70 or 80 on an actuator 102. The tool 100 includes a sleeve 104, that may be a sliding sleeve, having ports 106. The sleeve 104 is movable in a housing 108 such that the ports 106 are aligned with openings 110 or misaligned with openings 110. The tool has a greater reliability and service life since the seal subassemblies 14, 16, or 84 used therein do not become reverse mechanically loaded upon pressure reversal thereon, or as a result of pressure trap occurring between the opposite facing halves of the seal arrangement, due to the non-sealing features 18 or 88 being a part of a mechanical load redirection path through the subassemblies to the features.

Figure 11:
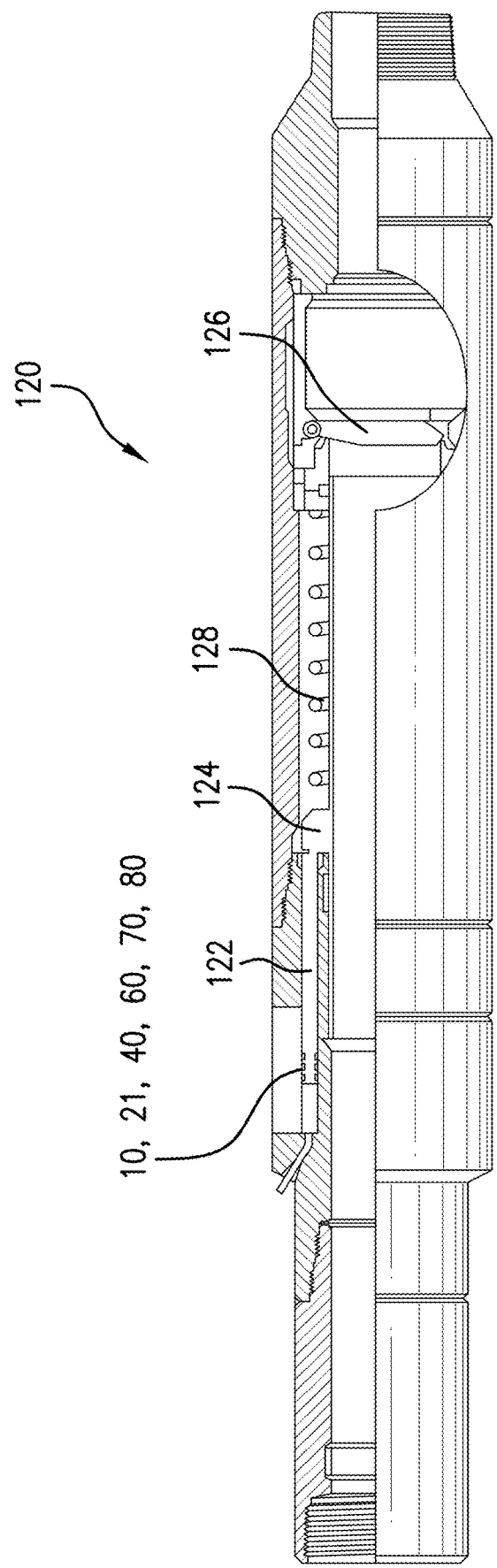
FIG. 11 is a downhole safety valve including one of the seal arrangement embodiments disclosed herein.

Referring to FIG. 11, another downhole tool 120 is illustrated that uses the seal arrangement 10, 21, 40, 60, 70 or 80 as disclosed herein. The tool 120 uses an actuator 122, upon which the seal arrangement 10, 21, 40, 60, 70 or 80 is disposed to actuate a flow tube 124. Upon actuation of the flow tube 124, a flapper 126 may be forced to an open position by the flow tube 124. The flow tube may return to a position wherein the flapper 126 is closed based upon the energy of a power spring 128. Due to the seal arrangement 10, 21, 40, 60, 70 or 80 as disclosed herein, reverse mechanical loading of the seal subassemblies 14, 16, or 84 is avoided and hence reliability of the downhole tool 120 is improved.

Figure 12:
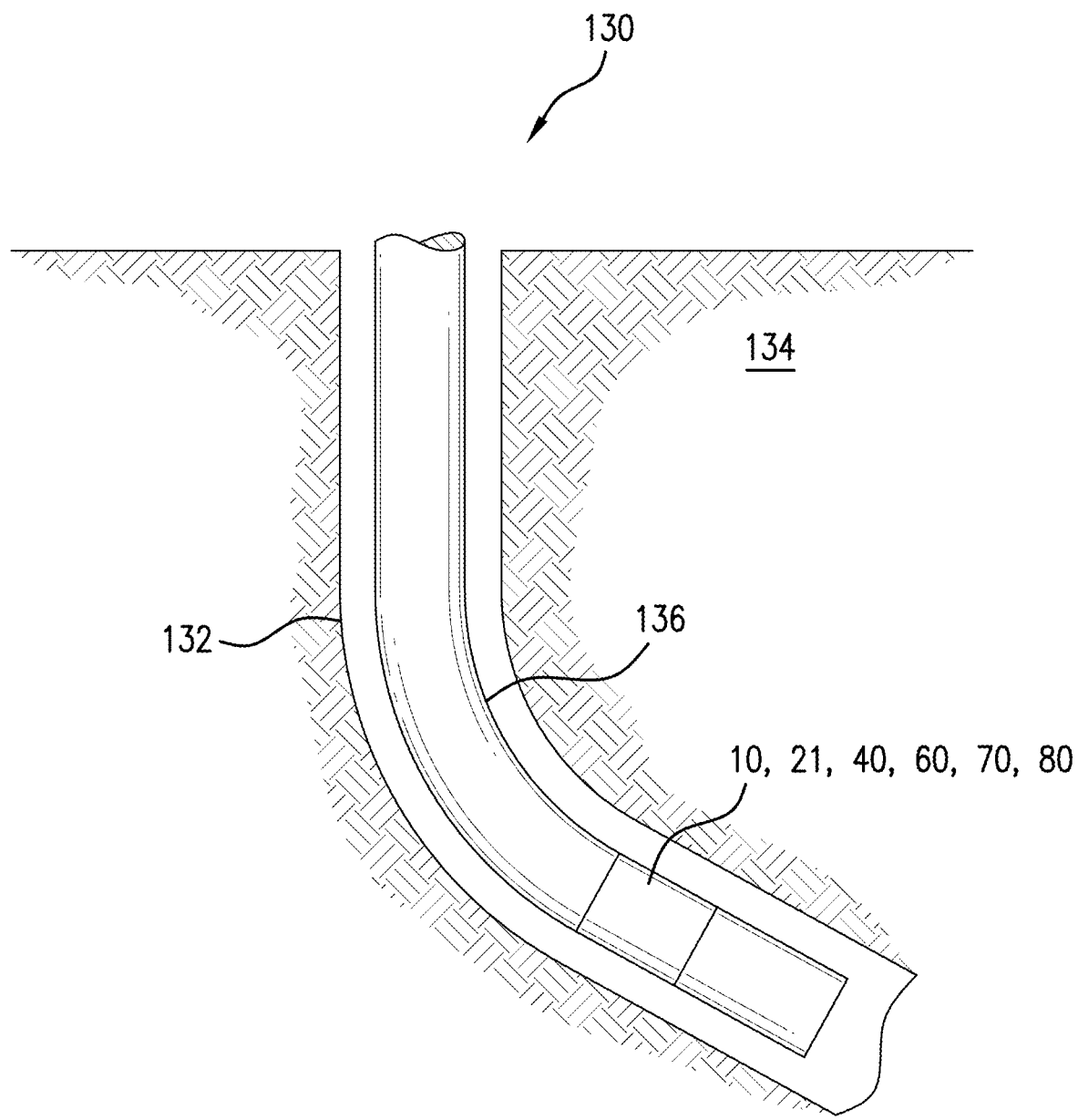
FIG. 12 is a view of a borehole system including a seal arrangement as disclosed herein.

Referring to FIG. 12, a wellbore system 130. The system 130 includes a borehole 132 in a subsurface formation 134. A string 136 is disposed in the borehole 132. A downhole tool that includes the seal arrangement 10, 21, 40, 60, 70, or 80 as disclosed herein is disposed in or as a part of the string 136.

Set forth below are some embodiments of the foregoing disclosure:

Embodiment 1: A seal arrangement including a seal assembly, a seal subassembly in operable contact with the seal assembly, the seal subassembly configured to impart energy to the seal assembly to promote sealing of the seal assembly with a mating surface, a non-sealing feature of the seal subassembly depending from the seal subassembly and interactive with a load shoulder of a structure adjacent the seal subassembly, the seal arrangement redirecting a mechanical load path through the seal subassembly to the non-sealing feature, during use.

Embodiment 2: The arrangement as in any prior embodiment wherein the non-sealing feature is disposed on one of an outer diameter of the seal subassembly or an inner diameter of the subassembly.

Embodiment 3: The arrangement as in any prior embodiment, wherein the arrangement is disposed on a mandrel and the load shoulder is a feature of the mandrel.

Embodiment 4: The arrangement as in any prior embodiment, wherein the arrangement is disposed on a rod piston and the load shoulder is in a housing within which the arrangement is disposed.

Embodiment 5: The arrangement as in any prior embodiment, wherein the load shoulder is an end of a separate box thread housing.

Embodiment 6: The arrangement as in any prior embodiment, wherein the non-sealing feature is the same material as the seal subassembly but having different material property.

Embodiment 7: The arrangement as in any prior embodiment, wherein the non-sealing feature is of a different material than the seal subassembly.

Embodiment 8: The arrangement as in any prior embodiment, wherein the different material is a material possessing a greater structural load carrying capacity than the seal subassembly.

Embodiment 9: The arrangement as in any prior embodiment, wherein the non-sealing feature is connected to the seal subassembly.

Embodiment 10: The arrangement as in any prior embodiment wherein the connection is one or more of chemical or mechanical.

Embodiment 11: The arrangement as in any prior embodiment, wherein the arrangement is a plurality of arrangements and wherein a pressure conduit is disposed within one of the arrangements and ports pressure to a location between the plurality of arrangements.

Embodiment 12: The arrangement as in any prior embodiment, wherein the seal assembly is a plurality of seal assemblies separated longitudinally, each of the plurality of seal assemblies being energized by one of a plurality of seal subassemblies.

Embodiment 13: The arrangement as in any prior embodiment, wherein the arrangement further includes a center bearing that aids in centralization of the arrangement.

Embodiment 14: The arrangement as in any prior embodiment, wherein the load shoulder is a part of a gland.

Embodiment 15: The arrangement as in any prior embodiment, wherein the gland in part comprises a separate threadably connected component.

Embodiment 16: The arrangement as in any prior embodiment, wherein the seal assembly has a cross sectional dimension that is diametrically larger than a cross sectional dimension of a unidirectional seal member of the seal subassembly.

Embodiment 17: The arrangement as in any prior embodiment, wherein the seal subassembly includes a mechanically energized unidirectional seal.

Embodiment 18: A downhole tool including a movable structure having a function related to the downhole tool, an actuator for the movable structure, and a seal arrangement as in any prior embodiment operably connected to the actuator.

Embodiment 19: A method of protecting a seal subassembly as in any prior embodiment, from reverse loading by redirecting the load path through the seal subassembly to the non-sealing feature, while also permitting pressure energizing of the seal assembly by the seal subassembly in a sealing direction.

Embodiment 20: A wellbore system including a borehole in a subsurface formation, a string in the borehole, and the arrangement as in any prior embodiment disposed within or as a part of the string.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The terms "about", "substantially" and "generally" are intended to include the degree of error associated with measurement of the particular quantity based upon the equipment available at the time of filing the application. For example, "about" and/or "substantially" and/or "generally" can include a range of ±8% a given value.

The teachings of the present disclosure may be used in a variety of well operations. These operations may involve using one or more treatment agents to treat a formation, the fluids resident in a formation, a borehole, and/or equipment in the borehole, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A seal arrangement comprising:
    a seal assembly;
    a seal subassembly in operable contact with the seal assembly, the seal subassembly configured to impart energy to the seal assembly to promote sealing of the seal assembly with a mating surface, the seal subassembly further including a unidirectional seal member;
    a non-sealing feature of the seal subassembly depending from the seal subassembly and interactive with a load shoulder of a structure adjacent the seal subassembly, the seal arrangement redirecting a mechanical load path through the seal subassembly to the non-sealing feature such that a mechanical load is absent in the unidirectional seal member, during use.

2. The arrangement as claimed in claim 1 wherein the non-sealing feature is disposed on one of an outer diameter of the seal subassembly or an inner diameter of the subassembly.

3. The arrangement as claimed in claim 1, wherein the arrangement is disposed on a mandrel and the load shoulder is a feature of the mandrel.

4. The arrangement as claimed in claim 1, wherein the arrangement is disposed on a rod piston and the load shoulder is in a housing within which the arrangement is disposed.

5. The arrangement as claimed in claim 1, wherein the load shoulder is an end of a separate box thread housing.

6. The arrangement as claimed in claim 1, wherein the non-sealing feature is the same material as the seal subassembly but having different material property.

7. The arrangement as claimed in claim 1, wherein the non-sealing feature is of a different material than the seal subassembly.

8. The arrangement as claimed in claim 7, wherein the different material is a material possessing a greater structural load carrying capacity than the seal subassembly.

9. The arrangement as claimed in claim 7, wherein the non-sealing feature is connected to the seal subassembly.

10. The arrangement as claimed in claim 9 wherein the connection is one or more of chemical or mechanical.

11. The arrangement as claimed in claim 1, wherein the arrangement is a plurality of arrangements and wherein a pressure conduit is disposed within one of the arrangements and ports pressure to a location between the plurality of arrangements.

12. The arrangement as claimed in claim 1, wherein the seal assembly is a plurality of seal assemblies separated longitudinally, each of the plurality of seal assemblies being energized by one of a plurality of seal subassemblies.

13. The arrangement as claimed in claim 1, wherein the arrangement further includes a center bearing that aids in centralization of the arrangement.

14. The arrangement as claimed in claim 1, wherein the load shoulder is a part of a gland.

15. The arrangement as claimed in claim 14, wherein the gland in part comprises a separate threadably connected component.

16. The arrangement as claimed in claim 1, wherein the seal assembly has a cross sectional dimension that is diametrically larger than a cross sectional dimension of a unidirectional seal member of the seal subassembly.

17. The arrangement as claimed in claim 1, wherein the seal subassembly includes a mechanically energized unidirectional seal.

18. A downhole tool comprising:
a movable structure having a function related to the downhole tool;
an actuator for the movable structure; and
a seal arrangement as claimed in claim 1 operably connected to the actuator.

19. A method of protecting a seal subassembly as claimed in claim 1, from reverse loading by redirecting the load path through the seal subassembly to the non-sealing feature, while also permitting pressure energizing of the seal assembly by the seal subassembly in a sealing direction.

20. A wellbore system comprising:
a borehole in a subsurface formation;
a string in the borehole; and
the seal arrangement as claimed in claim 1 disposed within or as a part of the string.

* * * * *